(12) United States Patent
Seo et al.

(10) Patent No.: US 11,429,064 B2
(45) Date of Patent: Aug. 30, 2022

(54) HOLOGRAPHIC DISPLAY APPARATUS FOR PROVIDING EXPANDED VIEWING WINDOW

(71) Applicant: SAMSUNG ELECTRONICS CO., LTD., Suwon-si (KR)

(72) Inventors: Juwon Seo, Osan-si (KR); Wontaek Seo, Yongin-si (KR); Geeyoung Sung, Daegu (KR); Changkun Lee, Seoul (KR); Hongseok Lee, Seoul (KR); Jaeseung Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 237 days.

(21) Appl. No.: 16/931,151

(22) Filed: Jul. 16, 2020

(65) Prior Publication Data
US 2020/0348459 A1 Nov. 5, 2020

Related U.S. Application Data

(63) Continuation of application No. 16/034,931, filed on Jul. 13, 2018, now Pat. No. 10,754,074.

(30) Foreign Application Priority Data

Feb. 19, 2018 (KR) .......................... 10-2018-0019523

(51) Int. Cl.
*G03H 1/12* (2006.01)
*G02B 27/01* (2006.01)
(Continued)

(52) U.S. Cl.
CPC ........... *G03H 1/12* (2013.01); *G02B 27/0103* (2013.01); *G03H 1/2205* (2013.01);
(Continued)

(58) Field of Classification Search
None
See application file for complete search history.

(56) References Cited

U.S. PATENT DOCUMENTS

| 5,936,667 A | 10/1999 | Hashimoto et al. |
| 5,973,844 A | 10/1999 | Burger |
| (Continued) | | |

FOREIGN PATENT DOCUMENTS

| GB | 2547929 A | 9/2017 |
| KR | 10-0850022 B1 | 8/2008 |
| (Continued) | | |

OTHER PUBLICATIONS

Communication dated Mar. 11, 2019 issued by the European Patent Office in European counterpart Application No. 18202946.2.
(Continued)

*Primary Examiner* — Darryl J Collins
*Assistant Examiner* — Tamara Y. Washington
(74) *Attorney, Agent, or Firm* — Sughrue Mion, PLLC

(57) ABSTRACT

A holographic display apparatus for providing an expanded viewing window includes a spatial filter configured to separate a plurality of holographic images generated by the hologram pattern displayed on the spatial light modulator from a plurality of lattice spots generated by a physical structure of the spatial light modulator. The spatial filter includes a plurality of color filters or a plurality of dichroic mirrors separating a first color image, a second color image, and a third color image from a first color lattice spot, a second color lattice spot, and a third color lattice spot.

20 Claims, 17 Drawing Sheets

(51) Int. Cl.
  *G03H 1/22* (2006.01)
  *G02B 5/32* (2006.01)
  *G03H 1/02* (2006.01)

(52) U.S. Cl.
  CPC ............ *G03H 1/2294* (2013.01); *G02B 5/32* (2013.01); *G02B 2027/0105* (2013.01); *G03H 2001/0216* (2013.01); *G03H 2001/0224* (2013.01); *G03H 2001/2207* (2013.01); *G03H 2001/2242* (2013.01); *G03H 2001/2271* (2013.01); *G03H 2223/12* (2013.01); *G03H 2223/15* (2013.01); *G03H 2223/55* (2013.01)

(56) References Cited

U.S. PATENT DOCUMENTS

| | | |
|---|---|---|
| 6,124,974 A | 9/2000 | Burger |
| 6,273,571 B1 | 8/2001 | Sharp et al. |
| 6,381,072 B1 | 4/2002 | Burger |
| 9,581,966 B1 | 2/2017 | Georges, III |
| 9,658,378 B2 | 5/2017 | Song et al. |
| 10,514,658 B2 | 12/2019 | Christmas |
| 2004/0021871 A1 | 2/2004 | Psaltis et al. |
| 2004/0046861 A1 | 3/2004 | Ramanujan et al. |
| 2005/0228231 A1 | 10/2005 | MacKinnon et al. |
| 2005/0234302 A1 | 10/2005 | MacKinnon et al. |
| 2006/0033972 A1 | 2/2006 | Takemori et al. |
| 2006/0132403 A1 | 6/2006 | Maximus et al. |
| 2011/0157599 A1 | 6/2011 | Weaver et al. |
| 2011/0267482 A1 | 11/2011 | Wetzstein et al. |
| 2014/0035959 A1 | 2/2014 | Lapstun |
| 2015/0085331 A1 | 3/2015 | Chae |
| 2016/0139402 A1 | 5/2016 | Lapstun |
| 2017/0082976 A1 | 3/2017 | Schwerdtner |
| 2017/0214907 A1 | 7/2017 | Lapstun |
| 2018/0129166 A1 | 5/2018 | Seo et al. |
| 2018/0335629 A1 | 11/2018 | Cheng et al. |
| 2019/0162950 A1 | 5/2019 | Lapstun |
| 2019/0166359 A1 | 5/2019 | Lapstun |

FOREIGN PATENT DOCUMENTS

| | | |
|---|---|---|
| KR | 10-2014-0114651 A | 9/2014 |
| KR | 10-2015-0033501 A | 4/2015 |

OTHER PUBLICATIONS

Tsuchiyama et al., Full-color large-scaled computer-generated holograms using RGB color filters, Optics Express, Feb. 2017, vol. 25, No. 3 (Year:2017).

HOLOGRAPHIC DISPLAY APPARATUS FOR PROVIDING EXPANDED VIEWING WINDOW

CROSS-REFERENCE TO RELATED APPLICATION

This application is a Continuation of U.S. application Ser. No. 16/034,931, filed on Jul. 13, 2018, which claims priority from Korean Patent Application No. 10-2018-0019523, filed on Feb. 19, 2018, in the Korean Intellectual Property Office, the disclosure of which is incorporated herein in its entirety by reference.

BACKGROUND

1. Field

Apparatuses consistent with exemplary embodiments relate to a holographic display apparatus, and more particularly to, a holographic display apparatus that provides an expanded viewing window when reproducing a holographic image via an off-axis technique.

2. Description of the Related Art

Methods such as glasses-type methods and non-glasses-type methods are widely used for realizing 3D images. Examples of glasses-type methods include deflected glasses-type methods and shutter glasses-type methods, and examples of non-glasses-type methods include lenticular methods and parallax barrier methods. When these methods are used, there is a limit to the number of viewpoints that may be implemented due to binocular parallax. Also, these methods make the viewers feel tired due to the difference between the depth perceived by the brain and the focus of the eyes.

Recently, holographic 3D image display methods, which provide full parallax and are capable of making the depth perceived by the brain consistent with the focus of the eyes, have been gradually put to practical use. According to such a holographic display technique, when light is irradiated onto a hologram pattern having recorded thereon an interference pattern obtained by interference between reference light and object light reflected from an original object, the light is diffracted and an image of the original object is reproduced. When a currently commercialized holographic display technique is used, a computer-generated hologram (CGH), rather than a hologram pattern obtained by directly exposing an original object to light, is provided to a spatial light modulator as an electrical signal. The spatial light modulator then forms a hologram pattern and diffracts light according to the input CGH signal, thereby generating a 3D image.

SUMMARY

According to an aspect of an exemplary embodiment, a holographic display apparatus includes a light source configured to provide light; a spatial light modulator configured to display a hologram pattern for reproducing a holographic image by modulating incident light; and a spatial filter configured to separate a plurality of holographic images generated by the hologram pattern displayed on the spatial light modulator from a plurality of lattice spots generated by a physical structure of the spatial light modulator, wherein each of the plurality of holographic images includes a first color image, a second color image, and a third color image formed at different positions, wherein each of the plurality of lattice spots includes a first color lattice spot, a second color lattice spot, and a third color lattice spot formed at different positions, and wherein the spatial filter includes a plurality of color filters or a plurality of dichroic mirrors configured to separate the first color image, the second color image, and the third color image from the first color lattice spot, the second color lattice spot, and the third color lattice spot.

The spatial filter may include a first pinhole transmitting a holographic image generated by a $0^{th}$ order diffraction in the spatial light modulator, and a plurality of second pinholes respectively transmitting a plurality of high order holographic images generated by a $\pm 1^{st}$ or higher order diffraction in the spatial light modulator.

The first pinhole may be configured to transmit the first color image, the second color image, and the third color image.

Each of the plurality of second pinholes may comprise the plurality of color filters.

Each of the plurality of second pinholes may include a first region on which the first color image is incident, a second region on which the first color image and the second color image are incident, a third region on which the second color image is incident, a fourth region on which the first color image, the second color image and the third color image are incident, a fifth region on which the second color image and the third color image are incident, and a sixth region on which the third color image is incident.

The plurality of color filters may include: a first color filter disposed in the first region and configured to transmit the first color image; a second color filter disposed in the second region and configured to transmit the first color image and the second color image; a third color filter disposed in the third region and configured to transmit the second color image; a fourth color filter disposed in the fourth region and configured to transmit the first color image, the second color image, and the third color image; a fifth color filter disposed in the fifth region and configured to transmit the second color image and the third color image; and a sixth color filter disposed in the sixth region and configured to transmit the third color image.

A distance between the first color filter and the first pinhole may be less than a distance between the sixth color filter and the first pinhole.

The spatial filter may include a first reflective surface reflecting a holographic image generated by a 0th order diffraction in the spatial light modulator and a plurality of second reflective surfaces respectively reflecting a plurality of high order holographic images generated by a ±1st order or higher diffraction in the spatial light modulator.

The first reflective surface may be configured to reflect the first color image, the second color image, and the third color image of the holographic image generated by the $0^{th}$ order diffraction.

Each of the plurality of second reflective surfaces may include the plurality of dichroic mirrors.

Each of the plurality of second reflective surfaces may include a first region on which the first color image is incident, a second region on which the first color image and the second color image are incident, a third region on which the second color image is incident, a fourth region on which the first color image, the second color image and the third color image are incident, a fifth region on which the second color image and the third color image are incident, and a sixth region on which the third color image is incident.

The plurality of dichroic mirrors may include a first dichroic mirror disposed in the first region and configured to reflect the first color image; a second dichroic mirror disposed in the second region and configured to reflect the first color image and the second color image; a third dichroic mirror disposed in the third region and configured to reflect the second color image; a fourth dichroic mirror disposed in the fourth region and configured to reflect the first color image, the second color image, and the third color image; a fifth dichroic mirror disposed in the fifth region and configured to reflect the second color image and the third color image; and a sixth dichroic mirror disposed in the sixth region and configured to reflect the third color image.

The holographic display apparatus may further include a first lens disposed between the spatial light modulator and the spatial filter; and a second lens configured to focus the plurality of holographic images separated by the spatial filter.

The spatial filter may include a first spatial filter disposed at a position at which the first color image is focused by the first lens; a second spatial filter disposed at a position at which the second color image is focused by the first lens; and a third spatial filter disposed at a position at which the third color image is focused by the first lens.

The first spatial filter may include a plurality of first color blocking filters disposed at positions corresponding to the first color lattice spots and configured to block light of a first color and to transmit light of the second color and the third color, wherein the second spatial filter includes a plurality of second color blocking filters disposed at positions corresponding to the second color lattice spots and configured to block light of a second color and to transmit light of the first color and the third color, and wherein the third spatial filter includes a plurality of third color blocking filters disposed at positions corresponding to the third color lattice spots and configured to block light of a third color and to transmit light of the first color and the second color.

Remaining regions of the first through third spatial filters in which the first through third color filters are not disposed may include a transparent material.

The first spatial filter may include a plurality of first color blocking filters further disposed at positions corresponding to complex conjugate images of the first color image, wherein the second spatial filter includes a plurality of second color blocking filters further disposed at positions corresponding to complex conjugate images of the second color image, and wherein the third spatial filter includes a plurality of third color blocking filters further disposed at positions corresponding to complex conjugate image of the third color image.

The first spatial filter may include a plurality of first dichroic mirrors disposed at positions corresponding to the first color images and configured to reflect light of the first color and to transmit light of the second color and the third color, wherein the second spatial filter includes a plurality of second dichroic mirrors disposed at positions corresponding to the second color images and configured to reflect light of the second color and to transmit light of the first color and the third color a, and wherein the third spatial filter includes a plurality of third dichroic mirrors disposed at positions corresponding to the third color images and configured to reflect light of the third color and to transmit light of the first color and the third color.

Remaining regions of the first to third spatial filters in which the first to third dichroic mirrors are not disposed may include a transparent material.

The spatial filter may have a hemispheric or paraboloid shape.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
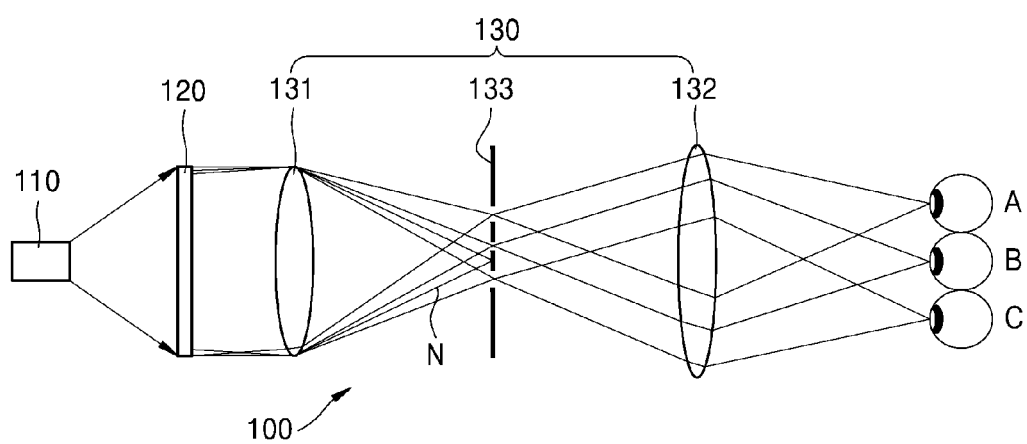
FIG. 1 is a diagram schematically illustrating a configuration of a holographic display apparatus according to an exemplary embodiment.

Hereinafter, with reference to the accompanying drawings, a holographic display apparatus for providing an expanded viewing window will be described in detail. Like reference numerals refer to like elements throughout, and in the drawings, sizes of elements may be exaggerated for clarity and convenience of explanation. The embodiments described below are merely exemplary, and various modifications may be possible from the embodiments. In a layer structure described below, an expression "above" or "on" may include not only "immediately on in a contact manner" but also "on in a non-contact manner". As used herein, the term "and/or" includes any and all combinations of one or more of the associated listed items.

FIG. 1 is a diagram schematically illustrating a configuration of a holographic display apparatus 100 according to an exemplary embodiment. Referring to FIG. 1, the holographic display apparatus 100 according to an exemplary embodiment may include a light source 110 for providing light, a spatial light modulator 120 for forming a hologram pattern for modulating incident light to reproduce a holographic image, and an optical system 130 for focusing the holographic image onto a space.

The light source 110 may include a laser providing light having a high coherency to the spatial light modulator 120. However, if the light incident on the spatial light modulator 120 has at least a certain level of spatial coherence, since the light may be diffracted and modulated by the spatial light modulator 120, a light-emitting diode (LED) may be used as the light source 110. In addition to the LED, any other light source may be used as long as light having spatial coherence is emitted. Although one light source 110 is illustrated in FIG. 1 for convenience of description, the light source 110 may include an array of a plurality of lasers or LEDs.

The spatial light modulator 120 may form a hologram pattern for diffracting and modulating the incident light, according to a hologram data signal provided by an image processor (not shown). The spatial light modulator 120 may comprise any one of a phase modulator for performing phase modulation, an amplitude modulator for performing amplitude modulation, and a complex modulator performing both phase modulation and amplitude modulation. Although the spatial light modulator 120 of FIG. 1 is a transmissive spatial light modulator, a reflective spatial light modulator may alternately be used. The transmissive spatial light modulator may comprise, for example, a semiconductor modulator based on a compound semiconductor such as gallium arsenide (GaAs), or a liquid crystal device (LCD). The reflective spatial light modulator may comprise, for example, a digital micromirror device (DMD), liquid crystal on silicon (LCoS) technology, or a semiconductor modulator.

The optical system 130 focuses light diffracted and modulated by the spatial light modulator 120 so that a holographic image is reproduced on a predetermined focal plane. To this end, in order to focus incident light onto a focal plane, the optical system 130 may include a first lens 131 and a second lens 132. Also, the optical system 130 may be configured to expand a viewing window, i.e., a location at which the holographic image may be observed. To this end, the optical system 130 may further include a spatial filter 133 configured to allow a plurality of holographic images generated by a $0^{th}$ order or higher diffraction, due to the hologram pattern displayed on the spatial light modulator 120, to be transmitted therethrough. The first lens 131 may focus an image reproduced by the spatial light modulator 120 onto the spatial filter 133. The second lens 132 may focus the holographic image separated by the spatial filter 133 onto a focal plane of the optical system 130.

An operation of the holographic display apparatus 100 will now be described below. The image processor (not shown) may generate a hologram data signal and provide the hologram data signal to the spatial light modulator 120. The hologram data signal may be a computer-generated hologram (CGH) signal computed to reproduce a target holographic image. The image processor may generate the hologram data signal according to a holographic image to be reproduced. The spatial light modulator 120 may form a hologram pattern on a surface of the spatial light modulator 120 according to the hologram data signal provided from the image processor. A principle of the spatial light modulator 120 forming the hologram pattern may be the same as a principle of, for example, a display panel displaying an image. For example, the hologram pattern may be displayed on the spatial light modulator 120 as an interference pattern including information regarding the holographic image to be reproduced.

Simultaneously, the light source 110 may provide the light to the spatial light modulator 120. The light incident on the spatial light modulator 120 may be diffracted and interfered with by the hologram pattern formed by the spatial light modulator 120. Then, the diffracted and interfered light may be focused on the focal plane of the optical system 130, and a three-dimensional holographic image may be reproduced at a predetermined space in front of the spatial light modulator 120. The shape and depth of the holographic image to be reproduced may be determined according to the hologram pattern formed by the spatial light modulator 120.

A spatial light modulator 120, typically used to perform one of a phase modulation and an amplitude modulation, comprises an array of a plurality of pixels, and thus the array of the plurality of pixels functions as a lattice. Thus, the incident light may be diffracted and interfered with not only by the hologram pattern formed by the spatial light modulator 120 but also by the pixel lattice of the spatial light modulator 120. Also, some of the incident light may not be diffracted by the hologram pattern, but may be transmitted without diffraction. As a result, a plurality of lattice spots may appear on the focal plane of the optical system 130 on which the holographic image is focused. The plurality of lattice spots may function as image noise that degrades the quality of the resultant holographic image and makes it uncomfortable for an observer to observe the holographic image.

To prevent the plurality of lattice spots from being seen by the observer, the holographic image may be reproduced via an off-axis technique so that a spot of the holographic image is reproduced while avoiding the plurality of lattice spots. The plurality of lattice spots are generated due to the internal structure of the spatial light modulator 120 and are unrelated to the hologram pattern, and thus the positions of the plurality of lattice spots are always fixed. However, a spot position of the holographic image is determined according to the hologram pattern, and thus the hologram pattern may be formed such that the holographic image is reproduced at a position at which the plurality of lattice spots are not present.

According to the off-axis technique, the spatial light modulator 120 may also form a periodic diffraction pattern for adjusting the reproduction position of the holographic image to be reproduced, together with the hologram pattern including information of the holographic image. To this end, the image processor may generate a diffraction pattern data signal as well as the hologram data signal and provide both signals to the spatial light modulator 120. Since a traveling direction of the incident light provided from the light source 110 is deviated by the periodic diffraction pattern displayed on the spatial light modulator 120, the reproduction position of the holographic image may be deviated from the lattice spot. A degree to which the reproduction position of the holographic image is shifted may be determined according to a period of the diffraction pattern.

Figure 2:
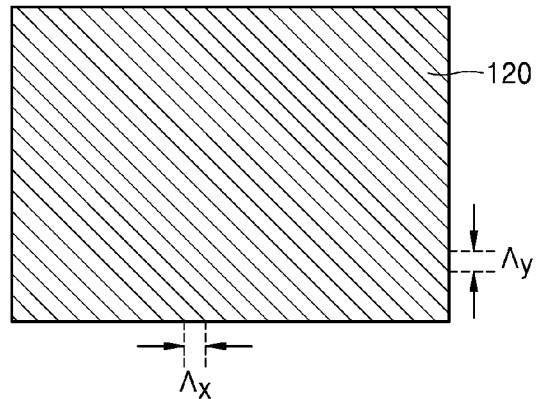
FIG. 2 illustrates a periodic diffraction pattern displayed on a spatial light modulator to reproduce a holographic image via an off-axis technique according to an exemplary embodiment.

FIG. 2 illustrates a periodic diffraction pattern P displayed on the spatial light modulator 120 to reproduce a holographic image via an off-axis technique according to an exemplary embodiment. In FIG. 2, although only the diffraction pattern P is shown for convenience, the spatial light modulator 120 may simultaneously display a hologram pattern for reproducing a holographic image together with the diffraction pattern P. As shown in FIG. 2, the diffraction pattern P has a period $\wedge x$ in an x-direction and a period $\wedge y$ in a y-direction. In this regard, the period $\wedge x$ in the x-direction is an interval between respective lattice lines constituting the diffraction pattern P, and the period $\wedge y$ in the y-direction between the lattice lines constituting the diffraction pattern P. A degree to which a reproduction position of the holographic image deviates from a lattice spot may be determined according to the periods $\wedge x$ and $\wedge y$ of the diffraction pattern P.

Figure 3:
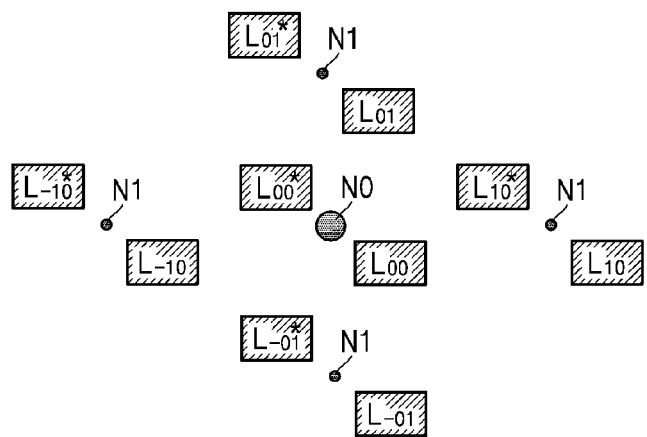
FIG. 3 illustrates positions of a plurality of holographic images and a plurality of lattice spots via an off-axis technique according to an exemplary embodiment.

FIG. 3 illustrates positions of a plurality of holographic images and a plurality of lattice spots N1 according to an off-axis technique, according to an exemplary embodiment. Referring to FIG. 3, one lattice spot N0 at the center is generated due to a $0^{th}$ order diffraction by a physical structure (i.e. a pixel lattice) inside the spatial light modulator 120, and the plurality of lattice spots N1 at the periphery of the lattice spot N0 are generated due to $\pm 1^{st}$ order diffraction by the pixel lattice of the spatial light modulator 120. In FIG. 3, an image denoted by $L_{00}$ is a holographic image generated due to $0^{th}$ order diffraction by the hologram pattern formed by the spatial light modulator 120, images denoted by $L_{01}$, $L_{-01}$, $L_{10}$ and $L_{-10}$ are holographic images generated due to $\pm 1^{st}$ order diffraction by the hologram pattern formed by the spatial light modulator 120. When a hologram pattern is formed without taking the lattice spots N0 and N1 into consideration, the lattice spots N0 and N1 will be positioned at spot centers of the reproduced holographic images $L_{00}$, $L_{01}$, $L_{-01}$, $L_{10}$, and $L_{-10}$. As a result, a noise image of the lattice spots N0 and N1 and the holographic images $L_{00}$, $L_{01}$, $L_{-01}$, $L_{10}$, and $L_{-10}$ may be seen together.

Therefore, the holographic images $L_{00}$, $L_{01}$, $L_{-01}$, $L_{10}$, and $L_{-10}$ may be formed to avoid the lattice spots N0 and N1 so as to prevent the lattice spots N0 and N1 from being seen by the observer. For example, as shown in FIG. 3, reproduction positions of the holographic image $L_{00}$, $L_{01}$, $L_{-01}$, $L_{10}$, and $L_{-10}$ may be moved by a predetermined distance in an x-direction and in a y-direction. To adjust the reproduction positions of the holographic images $L_{00}$, $L_{01}$, $L_{-01}$, $L_{10}$, and $L_{-10}$, the spatial light modulator 120 may display the periodic diffraction pattern P as shown in FIG. 2, in addition to a hologram pattern including information regarding a holographic image to be reproduced. A traveling direction of the incident light is thus deflected by the periodic diffraction pattern P displayed by the spatial light modulator 120, and thus the reproduction positions of the holographic images $L_{00}$, $L_{01}$, $L_{-01}$, $L_{10}$, and $L_{-10}$ are shifted from the lattice spots N0 and N1. When moving the reproduction positions of the holographic images $L_{00}$, $L_{01}$, $L_{-01}$, $L_{10}$, and $L_{-10}$, a complex conjugate image denoted by * may be displayed at a symmetrical position of the holographic image $L_{00}$, $L_{01}$, $L_{-01}$, $L_{10}$, and $L_{-10}$ based on the lattice spots N0 and N1.

Referring back to FIG. 1, the spatial filter 133 may be configured to block a lattice spots N0 and N1 and a complex conjugate image and to allow only the plurality of holographic images $L_{00}$, $L_{01}$, $L_{-01}$, $L_{10}$, and $L_{-10}$ to be transmitted therethrough. Thereby, the spatial filter 133 may separate the plurality of holographic images $L_{00}$, $L_{01}$, $L_{-01}$, $L_{10}$, and $L_{-10}$ generated by the hologram pattern displayed on the spatial light modulator 120 from the plurality of lattice spots N0 and N1 generated by the physical structure of the spatial light modulator 120 and the complex conjugate image generated by the off-axis. In this way, a noise image produced due to the lattice spots N0 and N1 and the complex conjugate image will not be visible or will be less visible to the observer. For example, the spatial filter 133 may include a plurality of pinholes for allowing a plurality of holographic images to be transmitted therethrough. When the spatial filter 133 is positioned on the focal plane of the first lens 131, positions of the plurality of pinholes of the spatial filter 133 may coincide with the spot positions of the plurality of holographic images.

Figure 4:
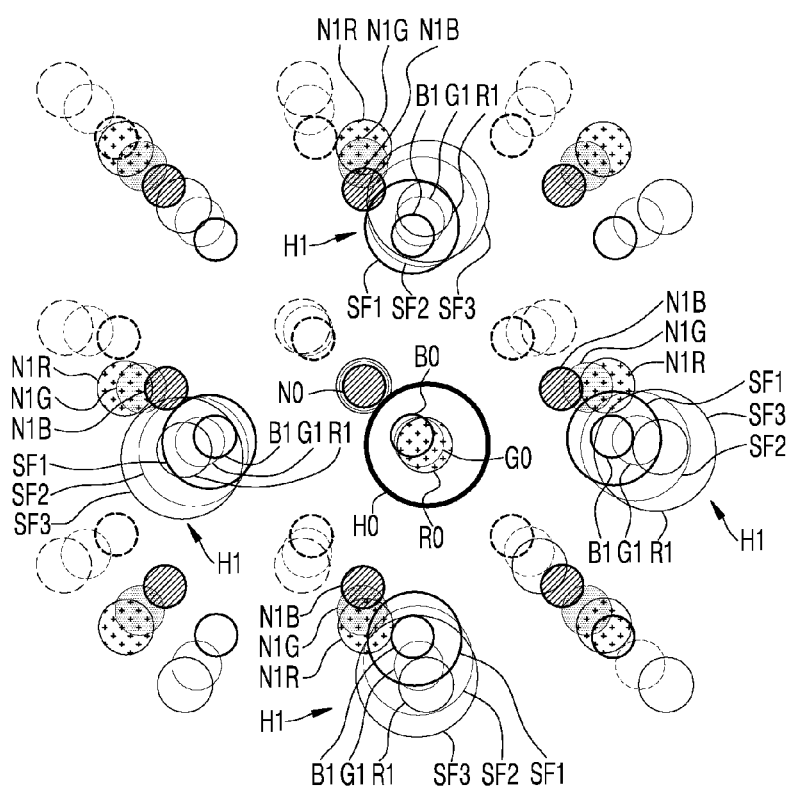
FIG. 4 illustrates positions of a plurality of holographic images for each color reproduced via an off-axis technique and a plurality of lattice spots for each color according to an exemplary embodiment.

However, when a blue light source, a green light source, and a red light source are used to realize a color holographic image, a position of a holographic image and a position of a lattice spot may be different for each color. For example, FIG. 4 illustrates positions of a plurality of holographic images for each color reproduced via an off-axis technique and a plurality of lattice spots for each color according to an exemplary embodiment. Referring to FIG. 4, each holographic image includes a blue holographic image, a green holographic image, and a red holographic image, and each lattice spot also includes a blue lattice spot, a green lattice spot, and a red lattice spot. Circles indicated by dashed lines in FIG. 4 represent complex conjugate images.

The lattice spot N0 generated due to $0^{th}$ order diffraction by a physical structure inside the spatial light modulator 120 is located at the center of a focal plane of the first lens 131 and positions of the blue lattice spot, the green lattice spot, and the red lattice spot are virtually the same. As a distance from the lattice spot N0 increases, a distance between the blue holographic image, the green holographic image, and the red holographic image gradually increases, and a distance between the blue lattice spot, the green lattice spot, and the red lattice spot also gradually increases. For example, the holographic image of each color and the lattice spots of each color are shifted away from the lattice spot N0 in the order of blue, green, and red.

In the case of a holographic image generated by $0^{th}$ order diffraction due to the hologram pattern nearest the lattice spot N0, although positions of the blue holographic image B0, the green holographic image G0 and the red holographic image R0 do not coincide with each other, the positional differences thereamong are not large. Also, the blue holographic image B0, the green holographic image G0 and the red holographic image R0 generated due to $0^{th}$ order diffraction are clearly separated from the lattice spot N0. Therefore, the blue holographic image B0, the green holographic image G0 and the red holographic image R0 may be completely separated from the lattice spots N0 and the complex conjugate images using only a single first pinhole H0 formed as a circular opening.

Each of the plurality of lattice spots N1 generated due to $1^{st}$ order diffraction by the physical structure inside the spatial light modulator 120 includes a blue lattice spot N1B, a green lattice spot N1G, and a red lattice spot N1R. A plurality of blue lattice spots N1B, a plurality of green lattice spots N1G, and a plurality of red lattice spots N1R may be symmetrically distributed with respect to the lattice spot N0. The blue lattice spot N1B, the green lattice spot N1G, and the red lattice spot N1R of a single lattice spot N1 partially overlap each other, through their centers are spaced apart from each other. Similarly, a plurality of blue holographic images B1, a plurality of green holographic images G1 and a plurality of red holographic images R1 generated due to 1st order diffraction by the hologram pattern may also be substantially symmetrically distributed with respect to the lattice spot N0. The blue holographic image B1, the green holographic image G1 and the red holographic image R1 belonging to one holographic image partially overlap each other, though their centers are spaced apart from each other.

Positional differences among the blue holographic image B1, the green holographic image G1 and the red holographic image R1 generated due to $1^{st}$ order diffraction are greater than the positional differences among the blue holographic image B0, the green holographic image G0, and the red holographic image R0 generated due to $0^{th}$ order diffraction. Therefore, the blue holographic image B1, the green holographic image G1 and the red holographic image R1 may not be clearly separated from the blue lattice spot N1B, the green lattice spot N1G, and the red lattice spot N1R. For example, in FIG. 4, the green lattice spot N1G and the red lattice spot N1R are located very close to the blue holographic image B1 and the green holographic image G1.

In this case, it may be difficult to completely separate the blue holographic image B1, the green holographic image G1 and the red holographic image R1 from the blue lattice spots N1B, the green lattice spots N1G, and the red lattice spot N1R using only a second pinhole H1 formed in the shape of an aperture. Therefore, the second pinhole H1 may include a plurality of color filters for separating the green holographic image G1 and the red holographic image R1 from the blue lattice spots N1B, the green lattice spots N1G, and the red lattice spot N1R. For example, referring to FIG. 4, the second pinhole H1 may include a first filter region SF1 centered on the blue holographic image B1, a second filter region SF2 centered on the green holographic image G1, and a third filter region SF3 centered on the red holographic image R1. The first filter region SF1 is larger than the blue holographic image B1 and may have a common center with the blue holographic image B1. Likewise, the second filter region SF2 is larger than the green holographic image G1 and may have a common center with the green holographic image G1, and the third filter region SF3 is larger than the red holographic image R1 and may have a common center with the holographic image R1.

Figure 5:
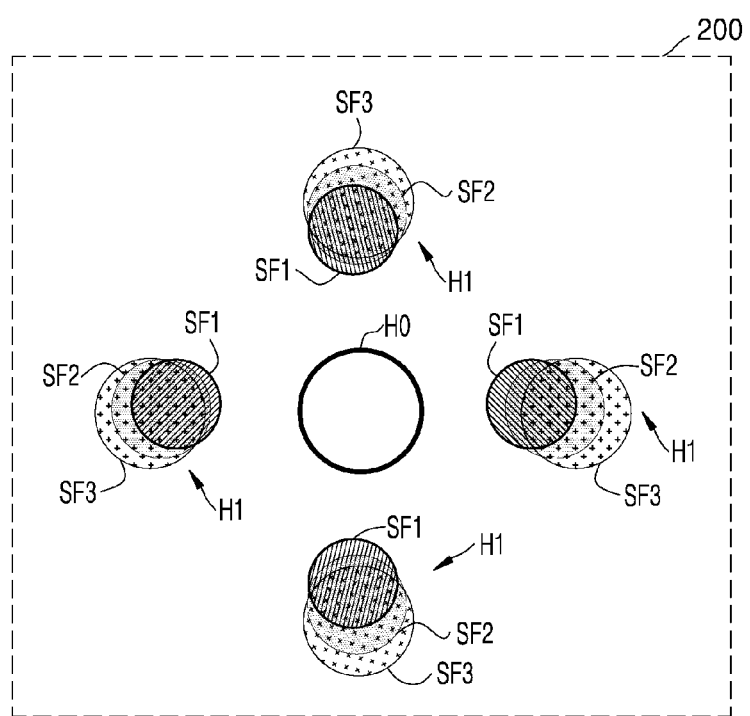
FIG. 5 illustrates positions and shapes of a plurality of pinholes of a spatial filter of the holographic display apparatus shown in FIG. 1 according to an exemplary embodiment.

FIG. 5 illustrates positions and shapes of the plurality of pinholes H0 and H1 of the spatial filter 133 of the holographic display apparatus 100 shown in FIG. 1 according to an exemplary embodiment. Referring to FIG. 5, the single first pinhole H0 is disposed at the center of the spatial filter 133. The first pinhole H0 may be a circular aperture penetrating through the spatial filter 133 or a circular transparent window that transmits visible light. When the first pinhole H0 is the aperture, the first pinhole H0 may transmit light in all wavelengths. The first pinhole H0 may transmit a holographic image generated due to 0th order diffraction in the spatial light modulator 120. To this end, the first pinhole H0 may be arranged to entirely encompass all spots of the blue holographic image B0, the green holographic image G0 and the red holographic image R0 in a focal plane of the first lens 131.

The plurality of second pinholes H1 are arranged around the first pinhole H0. The second pinhole H1 may transmit a plurality of higher order holographic images generated due to $\pm 1^{st}$ order or higher diffraction in the spatial light modulator 120. In order to separate the blue holographic image B1, the green holographic image G1 and the red holographic image R1 from the blue lattice spot N1B, the green lattice spot N1G and the red lattice spot N1R, each of the second pinholes H1 may include the first filter region SF1, the second filter region SF2, and the third filter region SF3. The plurality of first filter regions SF1, the plurality of second filter regions SF2 and the plurality of third filter regions SF3 may be symmetrically disposed with respect to the first pinhole H0. The first filter region SF1 is arranged to entirely encompass a spot of the blue holographic image B1 in the focal plane of the first lens 131, the second filter region SF2 is arranged to entirely encompass a spot of the green holographic image G1 in the focal plane of the first lens 131, and the third filter region SF3 is arranged to entirely encompass a spot of the red holographic image R1 in the focal plane of the first lens 131. A remaining part of the spatial filter 133, excluding the first pinhole H0 and the second pinholes H1, may include an opaque material that does not transmit light.

Figure 6:
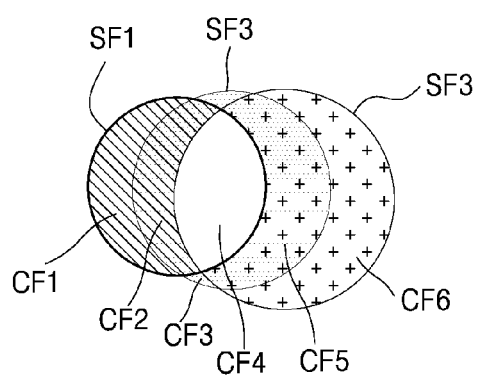
FIG. 6 illustrates an arrangement of a plurality of color filters disposed in a second pinhole of a spatial filter of the holographic display apparatus shown in FIG. 1 according to an exemplary embodiment.

In order to transmit only a holographic image of a desired color, a plurality of different color filters may be arranged in the first to third filter regions SF1, SF2, and SF3. FIG. 6 illustrates an arrangement of a plurality of color filters disposed in the second pinhole H1 of the spatial filter 133 of the holographic display apparatus 100 shown in FIG. 1 according to an exemplary embodiment. Since the blue holographic image B1, the green holographic image G1 and the red holographic image R1, belonging to one holographic image, overlap with each other, as shown in FIG. 6, the first to third filter regions SF1, SF2, and SF3 belonging to the single second pinhole H1 also overlap with each other. Accordingly, the first to third filter regions SF1, SF2, and SF3 may be subdivided into a plurality of partial regions. For example, the second pinhole H1 may include a first region including only the first filter region SF1, a second region where the first filter region SF1 and the second filter region SF2 overlap, a third region including only the second filter region SF2, a fourth region where all the first filter region SF1, the second filter region SF2 and the third filter region SF3 overlap, a fifth region where the second filter region SF2 and the filter region SF3 overlap, and a sixth region including only the sixth filter region SF6.

In this regard, the first region may correspond to a location of only the blue holographic image B1 on the spatial filter 133, and the second region may correspond to locations of the blue holographic image B1 and the green holographic image G1 on the spatial filter 133. The third region may correspond to a location of only the green holographic image G1 on the spatial filter 133, the fourth region may correspond to locations of all of the blue holographic image B1, the green holographic image G1 and the red holographic image R1 on the spatial filter 133, the fifth region may correspond to locations of both of the green holographic image G1 and the red holographic image R1 on the spatial filter 133, and the sixth region may correspond to a location of only the red holographic image R1 on the spatial filter 133.

Accordingly, the second pinhole H1 may include a first color filter CF1 arranged in the first region and transmitting the blue holographic image B1, a second color filter CF2 arranged in the second region and transmitting the blue holographic image B1 and the green holographic image G1, a third color filter CF3 arranged in the third region and transmitting the green holographic image G1, a fourth color filter CF4 arranged in the fourth region and transmitting the blue holographic image B1, the green holographic image G1 and the red holographic image R1, a fifth color filter CF5 arranged in the fifth region and transmitting the green holographic image G1 and the red holographic image R1, and a sixth color filter CF6 arranged in the sixth region and transmitting the red holographic image R1. For example, the fourth color filter CF4 may simply be an aperture or a transparent window that transmits visible light. When the fourth color filter CF4 is the aperture, the fourth color filter CF4 may transmit light of all wavelengths.

Referring again to FIG. 5, the plurality of first filter regions SF1, the plurality of second filter regions SF2, and the plurality of third filter regions SF3 may be symmetrically arranged with respect to the first pinhole H0. Since red light, having a long wavelength is refracted a comparatively little amount, and a blue light, having a short wavelength, is refracted a comparatively large amount, the first filter region SF1 corresponding to the blue holographic image B1 is arranged at a comparatively small distance to the first pinhole H0 and the third filter region SF3 corresponding to the red holographic image R1 may be arranged at a comparatively long distance to the first pinhole H0. Therefore, from among the first through sixth color filters CF1, CF2, CF3, CF4, CF5, and CF6, the first color filter CF1 is arranged closest to the first pinhole H0. For example, a distance between the first color filter CF1 and the first pinhole H0 is smaller than a distance between the sixth color filter CF6 and the first pinhole H0.

The holographic display apparatus 100 having the spatial filter 133 having the above-described structure may effectively block not only the lattice spot N0 due to $0^{th}$ order diffraction but also the lattice spots N1 due to $1^{st}$ order diffraction. Therefore, not only the holographic image formed by $0^{th}$ order diffraction but also the plurality of holographic images formed by $1^{st}$ or higher-order diffractions may be provided to an observer without noise. In this way, a space in which a user may observe the holographic image, that is, a viewing window is widened. Thus, the observer may observe the holographic image in a wider region.

Figure 7:
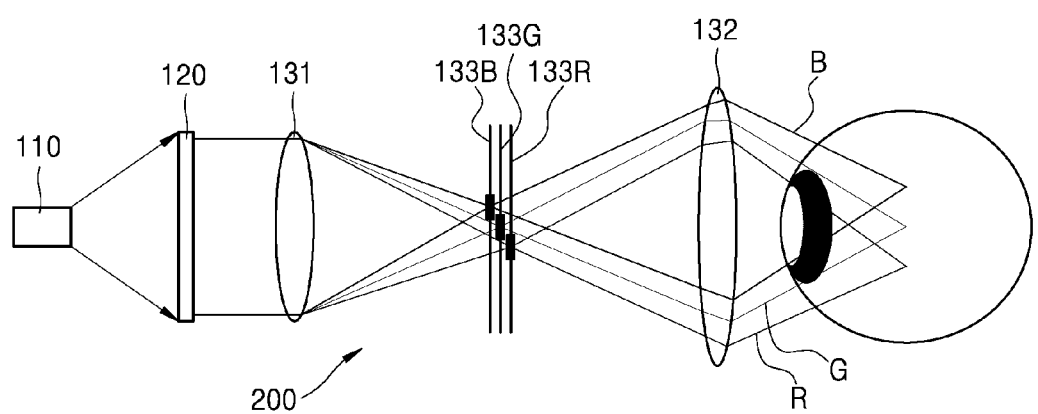
FIG. 7 is a configuration diagram schematically showing a configuration of a holographic display apparatus according to another exemplary embodiment.

The holographic display apparatus 100 shown in FIG. 1 has only one spatial filter 133, but is not limited thereto. FIG. 7 is a configuration diagram schematically showing a configuration of a holographic display apparatus 200 according to another exemplary embodiment. Referring to FIG. 7, the holographic display apparatus 200 may include three spatial filters 133B, 133G, and 133R disposed between the first lens 131 and the second lens 132. For example, the first spatial filter 133B separates a blue holographic image from a blue lattice spot and a blue complex conjugate image. The second spatial filter 133G separates a green holographic image from a green lattice spot and a green complex conjugate image, and the third spatial filter 133B separates a red holographic image from a red lattice spot and a red complex conjugate image.

Since a focal length of the first lens 131 is different for different wavelengths of light, the first to third spatial filters 133B, 133G and 133R may be arranged at different positions on an optical axis between the first lens 131 and the second lens 132. For example, the first spatial filter 133B may be arranged at a blue light focal distance of the first lens 131, the second spatial filter 133G may be arranged at a green light focal distance of the first lens 131, and the third spatial filter 133R may be arranged at a red light focal distance of the first lens 131. Accordingly, the first spatial filter 133B may be arranged closest to the first lens 131, and the second spatial filter 133G and the third spatial filter 133R may be sequentially disposed, on the optical path, after the first spatial filter 133B.

Figure 8A:
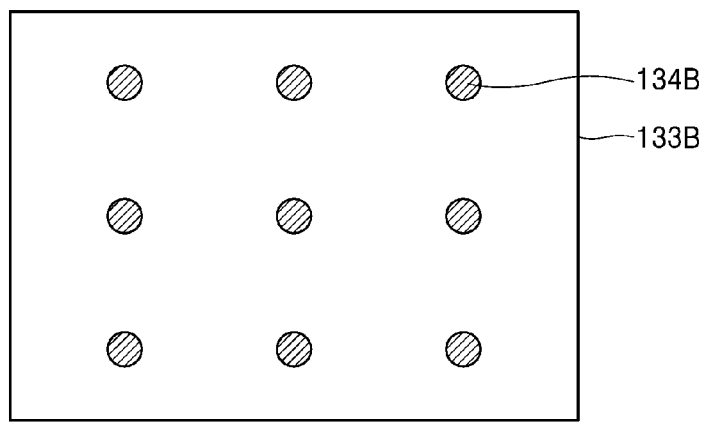
FIGS. 8A to 8C illustrate configurations of first to third spatial filters of the holographic display apparatus shown in FIG. 7, respectively, according to an exemplary embodiment.
Figure 8B:
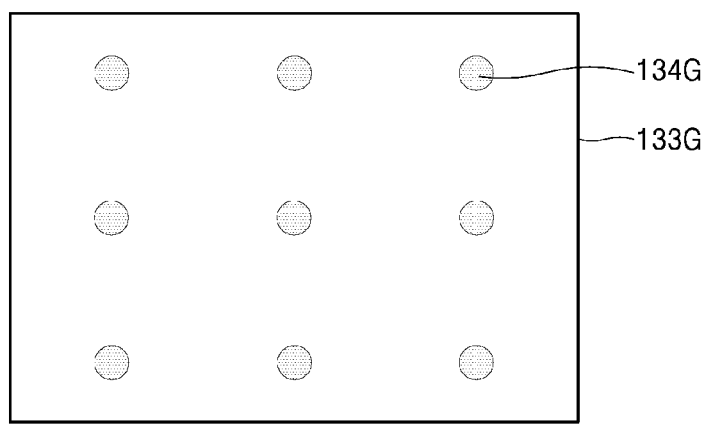
Figure 8C:
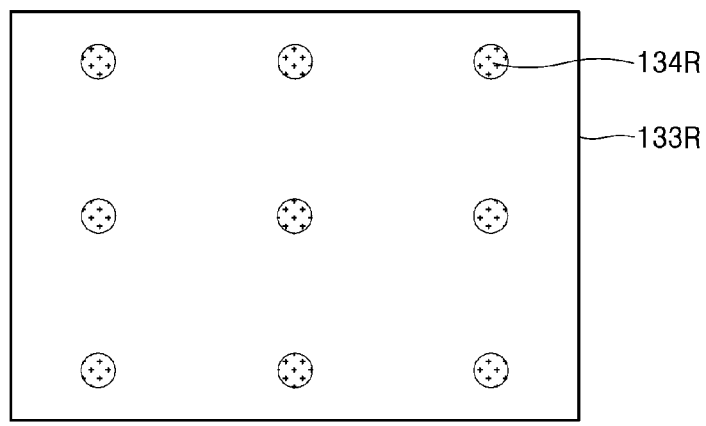

FIGS. 8A to 8C illustrate configurations of the first to third spatial filters 133B, 133G and 133R of the holographic display apparatus 200 shown in FIG. 7, respectively, according to an exemplary embodiment. Referring to FIGS. 8A to 8C, the first to third spatial filters 133B, 133G and 133R may include band blocking filters arranged at positions of a plurality of lattice spots. For example, the first spatial filter 133B may include a plurality of blue blocking filters 134B disposed at positions corresponding to a plurality of blue lattice spots, in order to block blue light and transmit green light and red light. The second spatial filter 133G may include a plurality of green blocking filters 134G disposed at positions corresponding to a plurality of green lattice spots, in order to block the green light and transmit the blue light and the red light. The third spatial filter 133R may include a plurality of red blocking filters 134R disposed at positions corresponding to a plurality of red lattice spots, in order to block the red light and transmit the blue light and the green light.

Remaining regions of the first to third spatial filters 133B, 133G, and 133R in which the blue blocking filter 134B, the green blocking filter 134G, and the red blocking filter 134R are not disposed may include a material transparent to visible light. In this way, a blue holographic image may be transmitted through the first spatial filter 133B. Since the blue holographic image is transmitted through the green blocking filter 134G or the red blocking filter 134R, the blue holographic image is not blocked by the second spatial filter 133G or the third spatial filter 133R. However, the blue lattice spots are incident on the blue blocking filter 134B of the first spatial filter 133B and thus blocked by the first spatial filter 133B. The green lattice spots are blocked by the green blocking filter 134G of the second spatial filter 133G after being transmitted through the first spatial filter 133B. Also, the red lattice spots are blocked by the red blocking filter 134R of the third spatial filter 133R after being transmitted through the first spatial filter 133B and the second spatial filter 133G.

As shown in FIG. 4, the blue lattice spots N1B, the green lattice spots N1G, and the red lattice spots N1R are sequentially spaced apart from the lattice spot N0, formed by $0^{th}$ order diffraction. Therefore, distances among the plurality of blue blocking filters 134B in the first spatial filter 133B are relatively close. Distances among the plurality of green blocking filters 134G in the second spatial filter 133G are larger than the distances among the plurality of blue blocking filters 134B. Also, distances among the plurality of red blocking filters 134R in the third spatial filter 133R are larger than the distances among the plurality of green blocking filters 134G. Positions of the blue blocking filters 134B, the green blocking filters 134G, and the red blocking filters 134B, arranged at the centers of the first to third spatial filters 133B, 133G, and 133R, respectively, and corresponding to the lattice spots N0 by $0^{th}$ order diffraction may coincide with each other.

The blue blocking filter 134B, the green blocking filter 134G, and the red blocking filter 134R, shown in FIGS. 8A to 8C, may be large so as to correspond to not only lattice spots but also a plurality of complex conjugate images. Alternately, the blue blocking filter 134B, the green blocking filter 134G, and the red blocking filter 134R corresponding to the plurality of complex conjugate images may be separately formed.

Figure 9A:
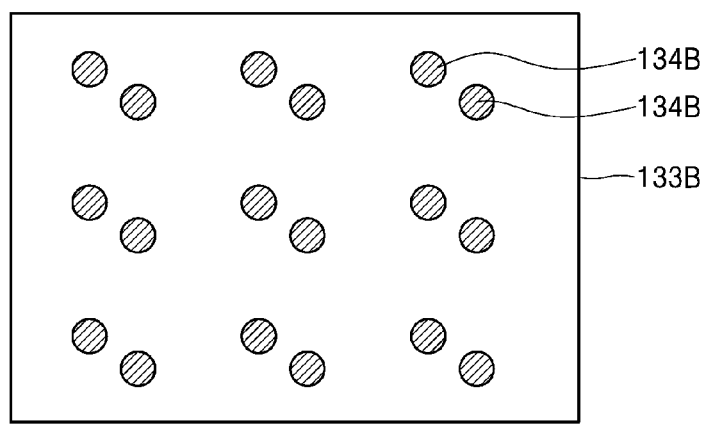
FIGS. 9A to 9C illustrate different configurations of the first to third spatial filters of the holographic display apparatus shown in FIG. 7, respectively, according to an exemplary embodiment.
Figure 9B:
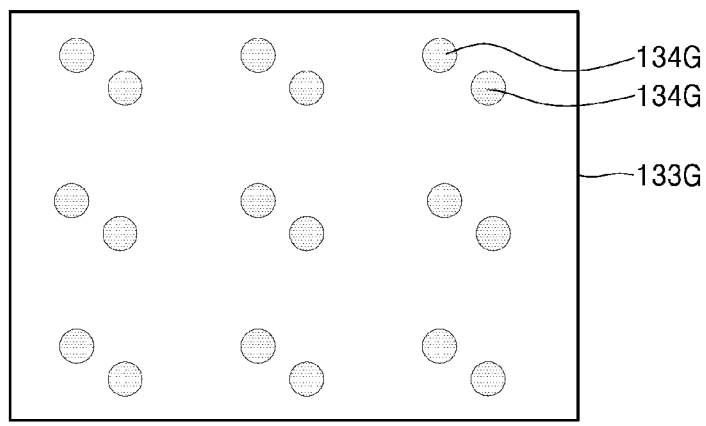
Figure 9C:
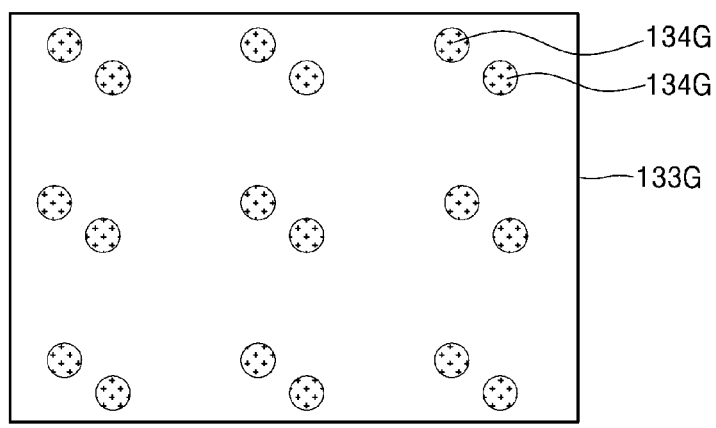

FIGS. 9A to 9C illustrate different configurations of the first to third spatial filters 133B, 133G, and 133R of the holographic display apparatus 200 shown in FIG. 7, respectively, according to an exemplary embodiment. Referring to FIGS. 9A to 9C, the first to third spatial filters 133B, 133G, and 133R may respectively include the blue blocking filters 134B, the green blocking filters 134G, and the red blocking filters 134R disposed at positions of a plurality of lattice spots, and may also, respectively, include additional blue blocking filters 134B, green blocking filters 134G, and red blocking filters 134R disposed at positions of a plurality of complex conjugate images. For example, the first spatial filter 133B may include the plurality of blue blocking filters 134B disposed at positions corresponding to blue complex conjugate images, the second spatial filter 133G may include the plurality of green blocking filters 134G disposed at positions corresponding to green complex conjugate images, and the third spatial filter 133R may include the plurality of red blocking filters 134R disposed at positions corresponding to red complex conjugate images.

Figure 10:
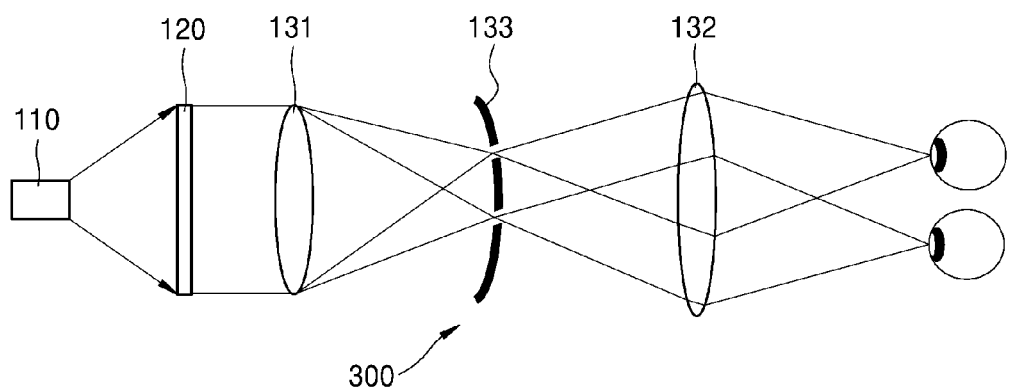
FIG. 10 is a schematic diagram showing a configuration of a holographic display apparatus according to another exemplary embodiment.

FIG. 10 is a schematic diagram showing a configuration of a holographic display apparatus 300 according to another exemplary embodiment. In the holographic display apparatus 100 shown in FIG. 1, the spatial filter 133 is shown as having a flat plate shape—i.e. a substantially planar shape. However, the focal plane on which the holographic images are focused by the first lens 131 may not be perfectly flat but may have a parabolic shape. Therefore, the spatial filter 133 may be formed to have a shape corresponding with the focal plane of the first lens 131. For example, as shown in FIG. 10, the spatial filter 133 may have a parabolic shape. Then, the plurality of pinholes H0 and H1 of the spatial filter 133 may be accurately positioned on the focal plane of the first lens 131.

Figure 11:
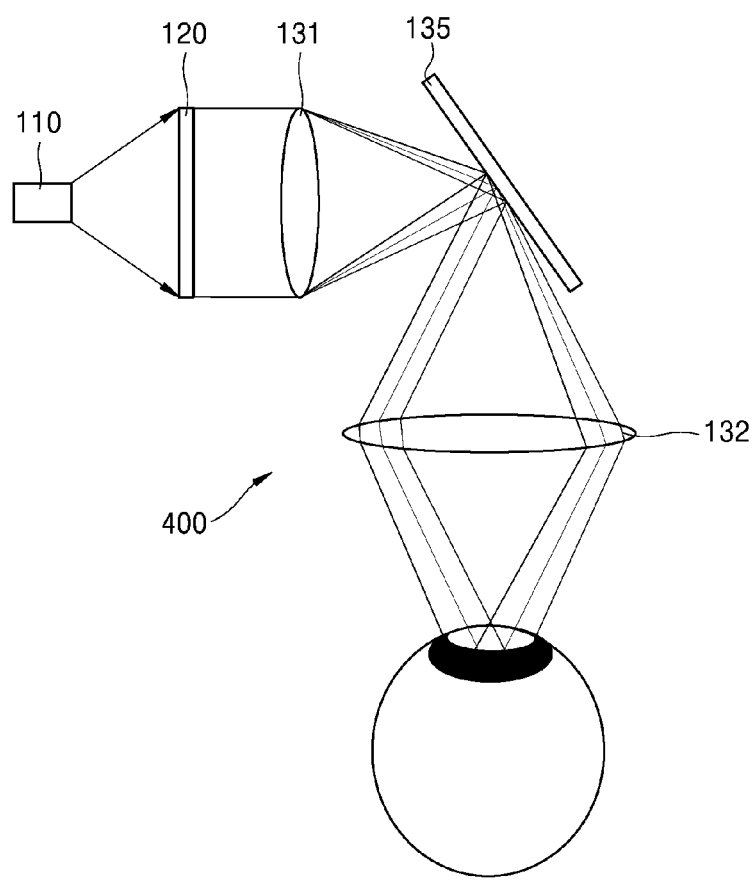
FIG. 11 is a schematic diagram showing a configuration of a holographic display apparatus according to another exemplary embodiment.

In the holographic display apparatuses 100, 200, and 300 described above, the spatial filters 133, 133B, 133G, and 133R are all transmissive. However, it is also possible to configure a reflective spatial filter. FIG. 11 is a schematic diagram showing a configuration of a holographic display apparatus 400 according to another exemplary embodiment. Referring to FIG. 11, the holographic display apparatus 400 may include a reflective spatial filter 135 disposed between the first lens 131 and the second lens 132. The spatial filter 135 may remove noise by selectively reflecting only holographic images and transmitting or absorbing lattice spots and complex conjugate images. The optical path between the first lens 131 and the second lens 132 may be bent, for example by about 90 degrees, by the spatial filter 135.

The spatial filter 135 may include a plurality of reflective surfaces to separate a plurality of holographic images generated by a hologram pattern displayed on the spatial light modulator 120 from a plurality of lattice spots generated by a physical structure inside the spatial light modulator 120 and a complex conjugate image generated via an off-axis. Such a plurality of reflective surfaces may be formed in consideration of positions of a plurality of holographic images for each color and positions of lattice spots for a plurality of colors shown in FIG. 4. For example, FIG. 12 exemplarily illustrates positions and shapes of a plurality of reflective surfaces M0 and M1 of the spatial filter 135 of the holographic display apparatus 400 shown in FIG. 11.

Figure 12:
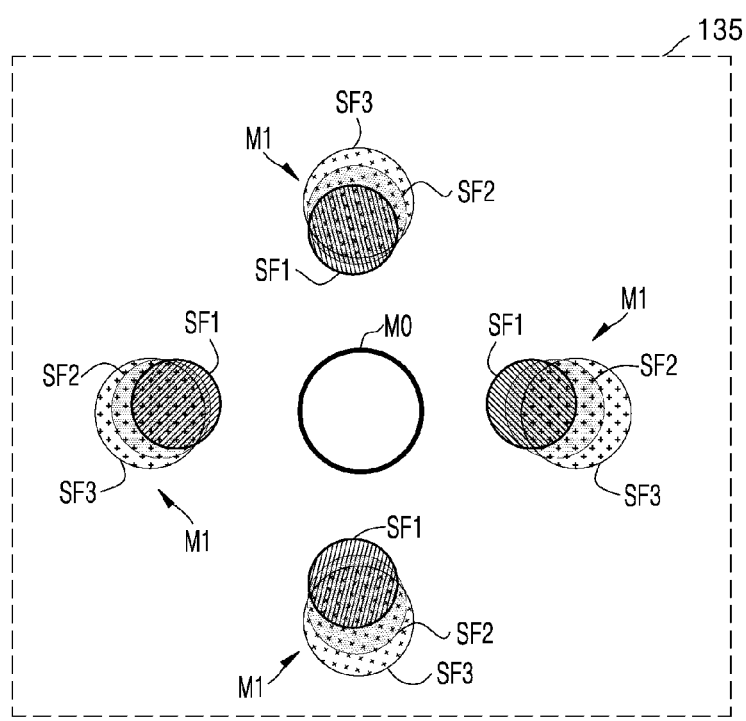
FIG. 12 illustrates positions and shapes of a plurality of reflective surfaces of a spatial filter of the holographic display apparatus shown in FIG. 11, according to an exemplary embodiment.

Referring to FIG. 12, the spatial filter 135 may include a first reflective surface M0 reflecting a holographic image generated by $0^{th}$ order diffraction in the spatial light modulator 120 and a plurality of second reflective surfaces M1 respectively reflecting a plurality of higher order holographic images generated by $\pm 1^{st}$ or higher orders of diffraction. At the center of the spatial filter 135, one first reflective surface M0 is disposed. The first reflective surface M0 may be simply a circular plane mirror capable of reflecting light of all wavelengths. The first reflective surface M0 may reflect the holographic image generated by $0^{th}$ order diffraction in the spatial light modulator 120. To this end, the first reflection surface M0 may be arranged in a position corresponding to all spots of the blue holographic image B0, the green holographic image G0 and the red holographic image R0 in a focal plane of the first lens 131.

The plurality of second reflective surfaces M1 are arranged around the first reflective surface M0. The second reflective surfaces M1 may reflect the plurality of higher order holographic images generated by $\pm 1^{st}$ order or higher diffraction in the spatial light modulator 120. In order to separate the blue holographic images B1, the green holographic images G1, and the red holographic images R1 from the blue lattice spots N1B, the green lattice spots N1G, and the red lattice spots N1R, each of the second reflective surfaces M1 may include the first filter region SF1, the second filter region SF2, and the third filter region SF3. The first filter regions SF1, the second filter regions SF2, and the third filter regions SF3 may be arranged symmetrically with respect to the first reflective surface M0. The first filter region SF1 is arranged to correspond to a spot of the blue holographic image B1 in the focal plane of the first lens 131, the second filter region SF2 is arranged to correspond to a spot of the green holographic image G1 in the focal plane of the first lens 131, and the third filter region SF3 is arranged to correspond to a spot of the red holographic image R1 in the focal plane of the first lens 131. The remaining part of the spatial filter 135, excluding the first reflective surface M0 and the second reflective surfaces M1, may include a transparent material which transmits light therethrough.

Figure 13:
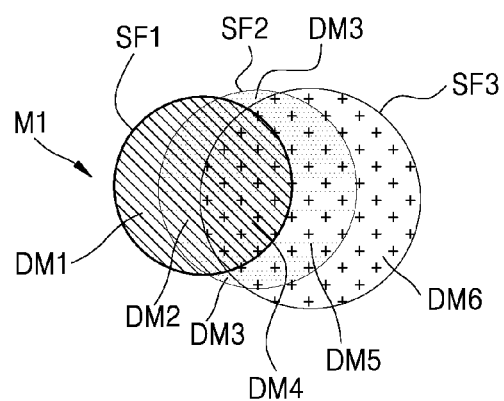
FIG. 13 illustrates an arrangement of a plurality of dichroic mirrors disposed on a second reflective surface in a spatial filter of the holographic display apparatus shown in FIG. 11 according to an exemplary embodiment.

In order to reflect only a holographic image of a desired color, a plurality of different dichroic mirrors may be arranged in the first to third filter regions SF1, SF2, and SF3. FIG. 13 illustrates an arrangement of a plurality of dichroic mirrors disposed on the second reflective surface M1 in the spatial filter 135 of the holographic display apparatus 400 shown in FIG. 11 according to an exemplary embodiment. Since the blue holographic image B1, the green holographic image G1, and the red holographic image R1, belonging to one single holographic image overlap with each other, as shown in FIG. 13, the first through third filter regions SF1, SF2, and SF3, belonging to the single second reflective surface M1, also overlap with each other. Accordingly, the first to third filter regions SF1, SF2, and SF3 may be subdivided into a plurality of partial regions. For example, the second reflective surface M1 may include a first region including only the first filter region SF1, a second region where the first filter region SF1 and the second filter region SF2 overlap, a third region including only the second filter region SF2, a fourth region where all the first filter region SF1, the second filter region SF2 and the third filter region SF3 overlap, a fifth region where the second filter region SF2 and the filter region SF3 overlap, and a sixth region including only the sixth filter region SF6.

In this regard, the first region may correspond to a location of only the blue holographic image B1 on the spatial filter 135, and the second region may correspond to locations of the blue holographic image B1 and the green holographic image G1 on the spatial filter 135. The third region also may correspond to a location of only the green holographic image G1 on the spatial filter 135, the fourth region may correspond to locations of all of the blue holographic image B1, the green holographic image G1 and the red holographic image R1 on the spatial filter 135, the fifth region may correspond to locations of both the green holographic image G1 and the red holographic image R1 on the spatial filter 135, and the sixth region may correspond to a location of only the red holographic image R1 on the spatial filter 135.

Accordingly, the second reflective surface M1 may include a first dichroic mirror DM1 arranged in the first region, reflecting only blue light and transmitting or absorbing light of other colors, a second dichroic mirror DM2 arranged in the second region, reflecting only blue light and green light and transmitting or absorbing light of other colors, a third dichroic mirror DM3 arranged in the third region, reflecting only green light and transmitting or absorbing light of other colors, a fourth dichroic mirror DM4 disposed in the fourth region and reflecting blue light, green light, and red light, a fifth dichroic mirror DM5 disposed in the fifth region, reflecting only green light and red light and transmitting or absorbing light of other colors, and a sixth dichroic mirror DM6 disposed in the sixth region, reflecting only red light and transmitting or absorbing light of other colors. For example, the fourth dichroic mirror DM4 may be a simple mirror that reflects light of all wavelengths, or may be a dichroic mirror that reflects only visible light. Then, the first dichroic mirror DM1 may reflect only the blue holographic image B1, the second dichroic mirror DM2 may reflect only the blue holographic image B1 and the green holographic image G1, the third dichroic mirror DM3 may reflect only the green holographic image G1, the fourth dichroic mirror DM4 may reflect the blue holographic image B1, the green holographic image G1 and the red holographic image R1, the fifth dichroic mirror DM5 may reflect only the green holographic image G1 and the red holographic image R1, and the sixth dichroic mirror DM6 may reflect only the red holographic image R1.

Referring again to FIG. 12, the plurality of first filter regions SF1, the plurality of second filter regions SF2, and the plurality of third filter regions SF3 may be symmetrically arranged with respect to the first reflective surface M0. For example, the first filter region SF1 corresponding to the blue holographic image B1 may be disposed comparatively closer to the first reflection surface M0, and the third filter region SF3 corresponding to the red holographic image R1 may be disposed comparatively farther from the first reflective surface M0. Therefore, among the first to sixth dichroic mirrors DM1, DM2, DM3, DM4, DM5 and DM6, the first dichroic mirror DM1 may be disposed closest to the first reflective surface M0. For example, a distance between the first dichroic mirror DM1 and the first reflective surface M0 is smaller than a distance between the sixth dichroic mirror DM6 and the first reflective surface M0.

Figure 14:
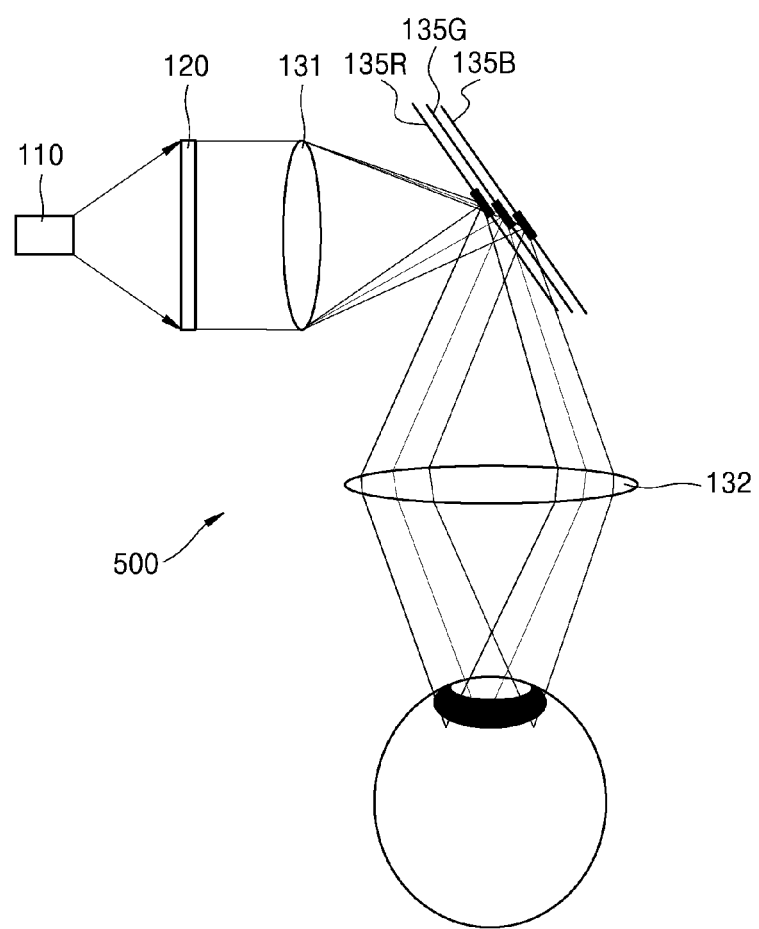
FIG. 14 is a schematic diagram showing a configuration of a holographic display apparatus according to another exemplary embodiment.

FIG. 14 is a schematic diagram showing a configuration of a holographic display apparatus 500 according to another exemplary embodiment. The holographic display apparatus 500 shown in FIG. 14 may include three spatial filters 135B, 135G, and 135R disposed between the first lens 131 and the second lens 132. For example, the first spatial filter 135B separates a blue holographic image from a blue lattice spot and a blue complex conjugate image. The second spatial filter 135G separates a green holographic image from a green lattice spot and a green complex conjugate image. The third spatial filter 135B separates a red holographic image from a red lattice spot and a red complex conjugate image. To this end, the first spatial filter 135B may be disposed at a blue light focal distance of the first lens 131, the second spatial filter 135G may be disposed at a green light focal distance of the first lens 131, and the third spatial filter 135R may be disposed at a red light focal distance of the first lens 131. Accordingly, the first spatial filter 135B may be disposed closest to the first lens 131, and the second spatial filter 135G and the third spatial filter 135R may be sequentially disposed, on the optical path, after the first spatial filter 135B.

Figure 15A:
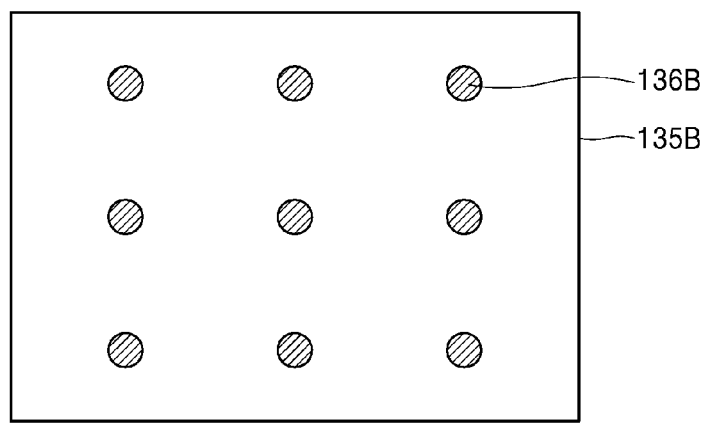
FIGS. 15A to 15C illustrate configurations of the first to third spatial filters of the holographic display apparatus of FIG. 14, respectively, according to an exemplary embodiment.
Figure 15B:
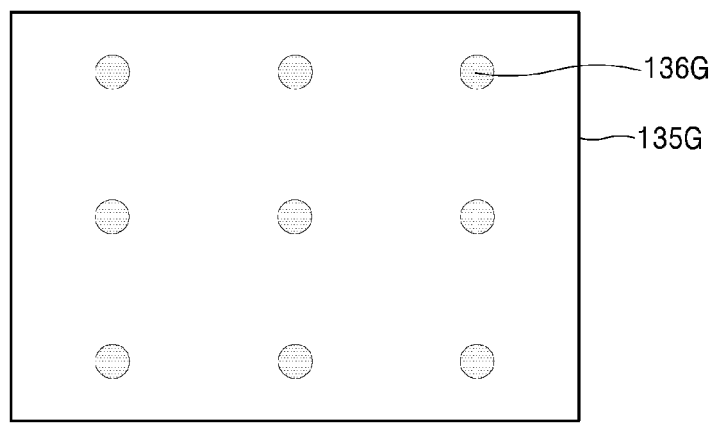
Figure 15C:
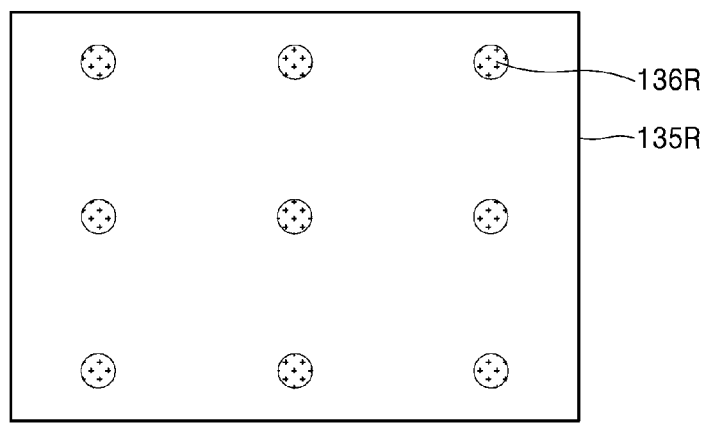

FIGS. 15A to 15C illustrate configurations of the first to third spatial filters 135B, 135G and 135R of the holographic display apparatus 500 shown in FIG. 14, respectively, according to an exemplary embodiment. Referring to FIGS. 15A to 15C, the first to third spatial filters 135B, 135G and 135R may include dichroic mirrors disposed at positions of a plurality of holographic images. For example, the first spatial filter 135B may include a plurality of first dichroic mirrors 136B disposed at positions corresponding to a plurality of blue holographic images B0 and B1, reflecting blue light, and transmitting green light and red light. The second spatial filter 135G may include a plurality of second dichroic mirrors 136G disposed at positions corresponding to a plurality of green holographic images G0 and G1, reflecting green light and transmitting blue light and red light. The third spatial filter 135R may include a plurality of third dichroic mirrors 136R disposed at positions corresponding to a plurality of red holographic images R0 and R1, reflecting red light and transmitting blue light and green light.

Remaining regions of the first to third spatial filters 135B, 135G, and 135R in which the first to third dichroic mirrors 136B, 136G, and 136R are not disposed may include a material that is transparent to visible light. Accordingly, the blue holographic images B0 and B1 may be reflected by the first dichroic mirror 136B in the first spatial filter 135B. However, since blue lattice spots and blue complex conjugate images are not incident on the first dichroic mirror 136B, the blue lattice spots and blue complex conjugate images pass through the first spatial filter 135B. The blue lattice spots and the blue complex conjugate images also pass through the second spatial filter 135G and the third spatial filter 135R. The green holographic images G0 and G1 may be reflected by the second dichroic mirror 136G in the second spatial filter 135G after passing through the first spatial filter 135B. The red holographic images R0 and R1 may be reflected by the third dichroic mirror 136R in the third spatial filter 135R after passing through the first spatial filter 135B and the second spatial filter 135G. The green lattice spots, the green complex conjugate images, the red lattice spots, and the red complex conjugate images all pass through the first to third spatial filters 135B, 135G and 135R.

As shown in FIG. 4, the blue holographic image B1, the green holographic image G1, and the red holographic image R1 are sequentially spaced away from the lattice spot N0 by $0^{th}$ order diffraction. Therefore, distances among the plurality of first dichroic mirrors 136B in the first spatial filter 135B are relatively close. Distances among the plurality of second dichroic mirrors 136G in the second spatial filter 135G are larger than the distances among the plurality of first dichroic mirrors 136B. Further, distances among the plurality of third dichroic mirrors 136R in the third spatial filter 135R are larger than the distances among the plurality of second dichroic mirrors 136G. Positions of the first to third dichroic mirrors 136B, 136G, and 136R arranged at the approximate centers of the first through third spatial filters 135B, 135G, and 135R and corresponding to the blue holographic image B0, the green holographic image G0, and the red holographic image R0 by $0^{th}$ order diffraction respectively are almost the same but not identical.

While holographic display apparatuses for providing an expanded viewing window, described above, have been shown and described in connection with the exemplary embodiments illustrated in the drawings, it will be understood by those of ordinary skill in the art that various modifications and equivalent embodiments may be made therefrom. Therefore, the disclosed exemplary embodiments should be considered in an illustrative sense rather than a restrictive sense. The range of the embodiments will be in the appended claims, and all of the differences in the equivalent range thereof should be understood to be included in the embodiments.

What is claimed is:

1. A holographic display apparatus comprising:
a light source;
a spatial light modulator comprising a plurality of pixels arranged in a lattice, wherein the spatial light modulator is configured to modulate light incident thereon from the light source and output a plurality of holographic images, and wherein a physical structure of the lattice outputs a plurality of lattice spots; and
a spatial filter configured to direct the plurality of holographic images toward a viewer and to block the plurality of lattice spots or to direct the plurality of lattice spots away from the viewer,
wherein each of the plurality of holographic images comprises a first color image and a second color image,
wherein each of the plurality of lattice spots comprises a first color lattice spot and a second color lattice spot, and
wherein the spatial filter is configured to separate the first color image and the second color image from the first color lattice spot and the second color lattice spot such that the first color image and the second color image are directed toward the viewer and the first color lattice spot and the second color lattice spot are blocked or directed away from the viewer.

2. The holographic display apparatus of claim 1, wherein the spatial filter comprises a first pinhole transmitting a holographic image generated by a 0th order diffraction in the spatial light modulator, and a plurality of second pinholes respectively transmitting a plurality of high order holographic images generated by a ±1st or higher order diffraction in the spatial light modulator.

3. The holographic display apparatus of claim 2, wherein the first pinhole is configured to transmit the first color image and the second color image of the holographic image generated by the 0th order diffraction.

4. The holographic display apparatus of claim 2, wherein each of the plurality of second pinholes comprises the plurality of color filters.

5. The holographic display apparatus of claim 4, wherein each of the plurality of second pinholes comprises a first region on which the first color image is incident, a second region on which the first color image and the second color image are incident, and a third region on which the second color image is incident.

6. The holographic display apparatus of claim 5, wherein the plurality of color filters comprises:
a first color filter disposed in the first region and configured to transmit the first color image;
a second color filter disposed in the second region and configured to transmit the first color image and the second color image; and
a third color filter disposed in the third region and configured to transmit the second color image.

7. The holographic display apparatus of claim 6, wherein a distance between the first color filter and the first pinhole is less than a distance between the third color filter and the first pinhole.

8. The holographic display apparatus of claim 1, wherein the spatial filter comprises a first reflective surface reflecting a holographic image generated by a 0th order diffraction in the spatial light modulator and a plurality of second reflective surfaces respectively reflecting a plurality of high order holographic images generated by a ±1st order or higher diffraction in the spatial light modulator.

9. The holographic display apparatus of claim 8, wherein the first reflective surface is configured to reflect the first color image and the second color image of the holographic image generated by the 0th order diffraction.

10. The holographic display apparatus of claim 8, wherein each of the plurality of second reflective surfaces comprises the plurality of dichroic mirrors.

11. The holographic display apparatus of claim 10, wherein each of the plurality of second reflective surfaces comprises a first region on which the first color image is incident, a second region on which the first color image and the second color image are incident, and a third region on which the second color image is incident.

12. The holographic display apparatus of claim 11, wherein the plurality of dichroic mirrors comprises:
a first dichroic mirror disposed in the first region and configured to reflect the first color image;
a second dichroic mirror disposed in the second region and configured to reflect the first color image and the second color image; and
a third dichroic mirror disposed in the third region and configured to reflect the second color image.

13. The holographic display apparatus of claim 1, further comprising:
a first lens disposed between the spatial light modulator and the spatial filter; and
a second lens configured to focus the plurality of holographic images separated by the spatial filter.

14. The holographic display apparatus of claim 13, wherein the spatial filter comprises:
a first spatial filter disposed at a position at which the first color image is focused by the first lens; and
a second spatial filter disposed at a position at which the second color image is focused by the first lens.

15. The holographic display apparatus of claim 14,
wherein the first spatial filter comprises a plurality of first color blocking filters respectively disposed at positions corresponding to the first color lattice spots and configured to block light of a first color and to transmit light of a different color, and
wherein the second spatial filter comprises a plurality of second color blocking filters respectively disposed at positions corresponding to the second color lattice spots and configured to block light of a second color and to transmit light of a different color.

16. The holographic display apparatus of claim 15, wherein remaining regions of the first spatial filter and the second spatial filter in which the plurality of first color blocking filters and the plurality of second color blocking filters are not disposed comprise a transparent material.

17. The holographic display apparatus of claim 15,
wherein the first spatial filter comprises a plurality of additional first color blocking filters respectively disposed at positions corresponding to complex conjugate images of the first color image, and
wherein the second spatial filter comprises a plurality of additional second color blocking filters respectively disposed at positions corresponding to complex conjugate images of the second color image.

18. The holographic display apparatus of claim 14,
wherein the first spatial filter comprises a plurality of first dichroic mirrors respectively disposed at positions corresponding to the first color images and configured to reflect light of the first color and to transmit light of the second color, wherein the second spatial filter comprises a plurality of second dichroic mirrors respectively disposed at positions corresponding to the second color images and configured to reflect light of the second color and to transmit light of the first color.

19. The holographic display apparatus of claim 18, wherein remaining regions of the first spatial filter and the second spatial filter in which the plurality of first dichroic mirrors and the plurality of second dichroic mirrors are not disposed comprise a transparent material.

20. The holographic display apparatus of claim 1, wherein the spatial filter has a hemispheric or paraboloid shape.

* * * * *